Figure 4:
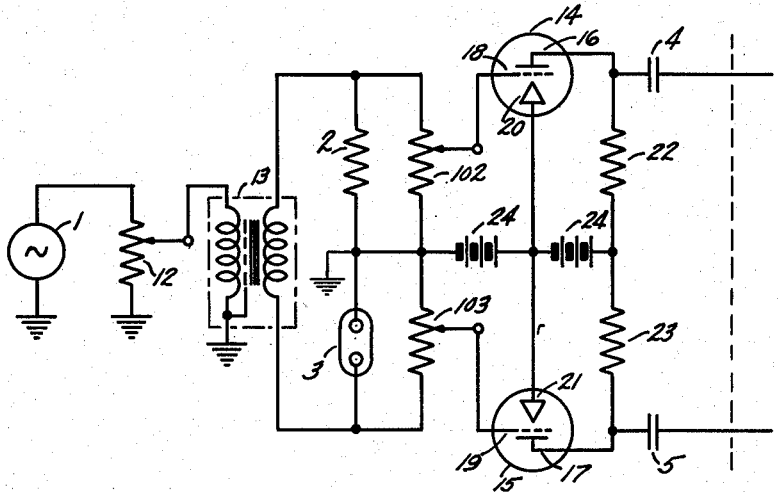

April 15, 1952      L. E. PACKARD ET AL      2,593,175
ELECTRIC METHOD AND SYSTEM FOR MEASURING
IMPEDANCE MAGNITUDE AND PHASE ANGLE
Filed July 8, 1947      2 SHEETS—SHEET 1
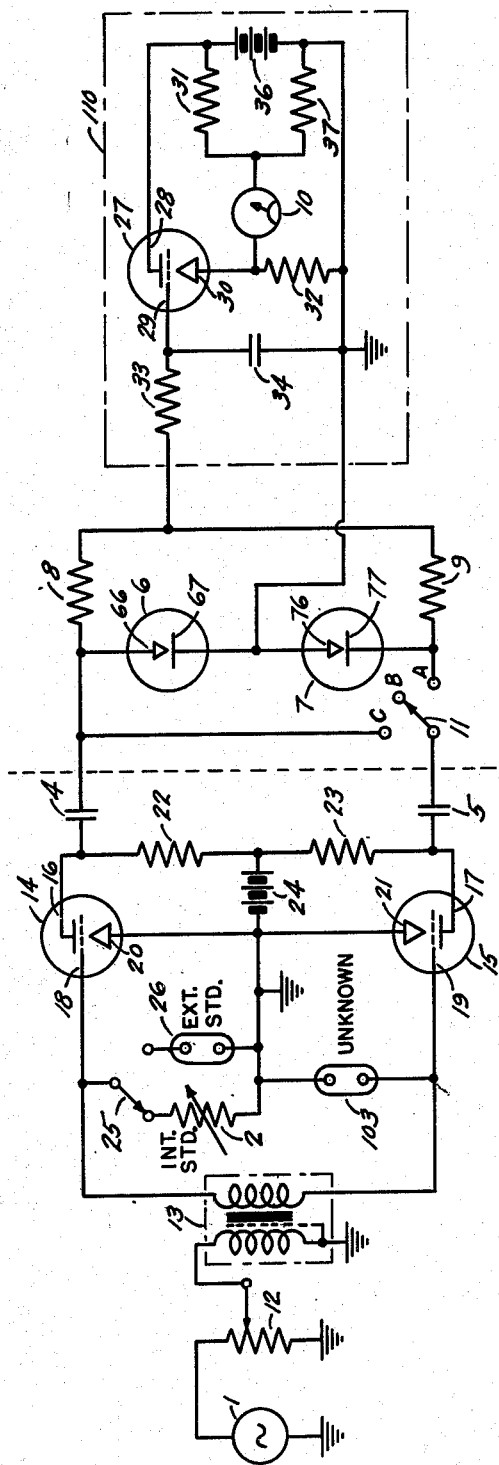
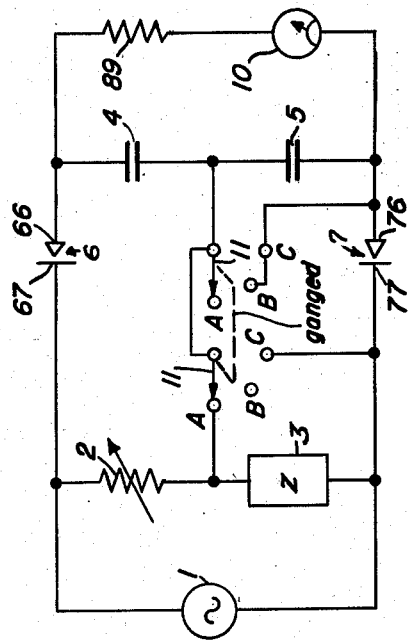
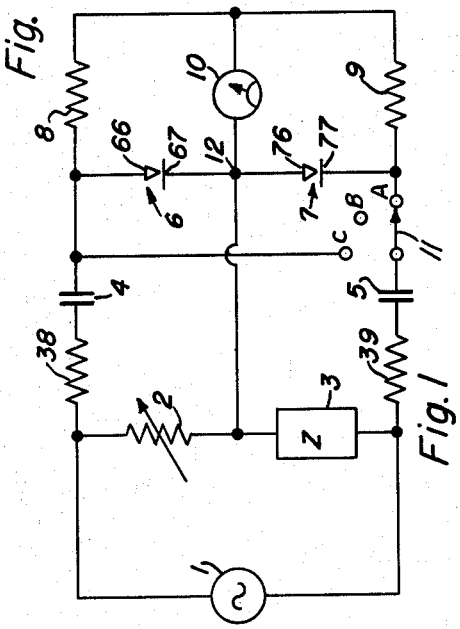
INVENTORS.
Hermon Hosmer Scott
Lucius Everett Packard
BY
ATTORNEY April 15, 1952

L. E. PACKARD ET AL 2,593,175

ELECTRIC METHOD AND SYSTEM FOR MEASURING
IMPEDANCE MAGNITUDE AND PHASE ANGLE

Filed July 8, 1947

2 SHEETS—SHEET 2

INVENTORS.
Hermon Hosmer Scott
Lucius Everett Packard

BY

ATTORNEY

Patented Apr. 15, 1952

2,593,175

UNITED STATES PATENT OFFICE 2,593,175

ELECTRIC METHOD AND SYSTEM FOR MEASURING IMPEDANCE MAGNITUDE AND PHASE ANGLE

Lucius E. Packard, Concord, and Hermon H. Scott, Lincoln, Mass., assignors to Technology Instrument Corporation, Waltham, Mass., a corporation of Massachusetts Application July 3, 1947, Serial No. 759,598

11 Claims. (Cl. 175—183)

The present invention relates to systems for measuring the impedance of an electric circuit or device to alternating current, including measurements of impedance magnitude and phase angle. The invention further relates to vacuum tube voltmeters, bridges and phase meters.

Various devices for measuring impedance are in use or have been proposed. The most commonly used are various types of bridge circuits which generally indicate the impedance either directly or indirectly in terms of real and imaginary vector components commonly expressed as $R+jX$, where R is the resistive component in which a zero phase angle exists between the applied voltage and the current, and X is the reactive component, positive if inductive, and negative if capacitive, in which the current lags or leads, respectively, the applied voltage by 90°.

Most bridge circuits have the disadvantage that the readings must be multiplied or divided by a factor involving the frequency of the applied signal in order to obtain the correct value for at least one of the quadrature components of the impedance. This is particularly true in those bridges designed to measure both inductance and capacitance. Furthermore, to obtain the absolute magnitude and phase angle of the impedance, further computations must be resorted to, as for instance, the usual expressions $$Z=\sqrt{R^2+\overline{X}^2}$$

and $$\theta=\tan^{-1}\frac{\overline{X}}{R}$$

where Z is the absolute value of the impedance, and $\theta$ is the phase angle of the impedance, that is, the angle by which the current will lag or lead the voltage, depending upon the sign of the phase angle.

In communications circuits, for proper matching and evaluation of operating characteristics, a complete knowledge is necessary of both the absolute magnitudes and phase angles of the impedances involved. Simple arrangements involving standard decade resistance boxes are often used to obtain approximate impedance measurements by the so-called two-voltmeter and voltmeter-ammeter methods. Such measurements, however, give no indication of phase angle, and the impedance data obtained are open to serious question, particularly at higher frequencies because of stray reactances associated with the circuit.

A chief object of the present invention is to provide a simple, inexpensive and satisfactory means for measuring the absolute magnitude and/or the phase angle of an alternating current impedance with a high degree of accuracy and convenience and to provide for the purpose of making such measurements, a single self-contained measuring instrument which shall be portable and easily operated.

Another object is to provide a novel means for comparing two alternating voltages in absolute magnitude and for measuring the phase difference between them.

Another object is to provide a novel means for measuring an alternating voltage with respect to magnitude and/or phase.

A further object is to provide a novel type of vacuum-tube voltmeter or vacuum tube ammeter.

A still further object is to provide a novel phase meter.

While the type of circuit used differs from conventional bridges, the function is nevertheless similar to bridges in certain respects, and the present invention consequently provides also a novel type of bridge or a novel means of obtaining a result equivalent to a bridge.

Another object is to provide a bridge in which some of the arms and, in particular, the variable arms are composed of or controlled by vacuum tubes, and are varied by varying the operating characteristics of said vacuum tubes.

Figure 5:
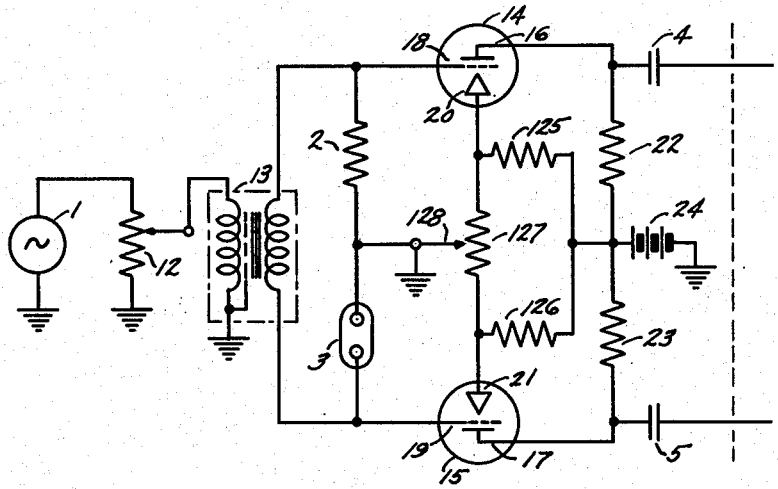

The invention will now be explained in connection with the drawings, of which Fig. 1 represents a diagrammatic, simplified view of circuits and apparatus illustrating the fundamental functions of a circuit embodying the present invention and suitable for measuring impedance in terms of absolute magnitude and phase angle, said phase angle measurement being in terms of the difference between the voltage drops across an unknown and a standard impedance; Fig. 2 illustrates an arrangement alternative to Fig. 1, showing optional methods of connecting the diodes and measuring phase angle in terms of the sum of the voltage drops across the unknown and standard impedances. Fig. 3 is a more elaborate circuit representing the fundamental arrangements of a commercial test instrument utilizing the principles of the present invention. Fig. 4 shows a circuit alternative to Fig. 3 in which voltage dividers or attenuators are used to obtain balance instead of, or in addition to, varying the standard impedance; and Fig. 5 shows still another alternative to Figs. 3 and 4 in which the amplification or other characteristics of vacuum tubes are varied as a means of obtaining balance.

Referring now to Fig. 1, the output of a source 1 of alternating current is applied in series to the variable standard resistance or impedance 2 and the unknown impedance 3. With the switch 11 set in position A, the alternating voltages developed across the impedances 2 and 3 are rectified by the rectifiers 6 and 7, respectively, thus causing the existence of a direct voltage across the rectifier 6 and the condenser 4, as a result of the alternating voltage existing across impedance 2 and a second direct voltage to exist across rectifier 7 and condenser 5, as a result of the alternating voltage existing across unknown impedance 3. Condensers 4 and 5 are for blocking purposes to allow the existence of the aforesaid direct voltages and may be omitted in some alternative rectifier circuits.

Resistors 38 and 39 are provided to keep the impedance of the circuit, including the rectifiers and associated circuit elements such as resistors 8 and 9, from drawing appreciable alternating current, which is large as compared to the alternating current passing through impedances 2 and 3, in order to provide accurate readings over wide impedance ranges without the necessity of making corrections. Resistors 38 and 39 may, however, be omitted under some conditions.

One terminal of condenser 4 is connected directly to the cathode 66 of rectifier 6, and the other terminal is connected to the point 12 and the anode 67 of rectifier 6 through the resistor 38 and the impedance 2, and also through the current source 1 and the impedance 3. Similarly, condenser 5 is connected on one side directly to the anode 77 of rectifier 7 through switch 11 when the switch is in the A position, and the other terminal of condenser 5 is connected through resistor 39 to the point 12 by means of impedance 3, or through the current source 1 and impedance 2. So long as the current source 1 can conduct direct current, which is generally, but not necessarily the case, only one of the two impedances 2 and 3 need be capable of conducting direct current in order to provide the proper connections for the direct voltages in the circuit. Accordingly, either the impedance 2 or the impedance 3 may be capacitive, that is, it may have an infinite value for direct current. Impedance 2 is normally a variable resistance, but it may also be a variable inductance or a variable capacitance.

Returning now to the aforementioned voltage drops existing across rectifiers 6 and 7 and maintained by condensers 4 and 5, said voltage drops will cause direct current to flow through resistors 8 and 9, respectively, and thence through the indicating instrument or meter 10. Since the rectifiers 6 and 7 are connected in series, the currents through meter 10 resulting from rectification of the two alternating voltages will be opposite in direction and will tend to cancel. It is also, of course, possible to use an equivalent circuit in which the impedances 2 and 3 are connected in parallel across the voltage source 1 and adjusted for equal current instead of equal voltage.

Convenient circuit values for Fig. 1 are obtained when the impedances 2 and 3 are sufficiently low so that the additional current flowing through the resistors 38 and 39, the condensers 4 and 5, the rectifiers 6 and 7, and the resistors 8 and 9 may be neglected. The current through impedances 2 and 3 will then be the same. Absolute magnitude of the voltages appearing across impedances 2 and 3 will be equal. If then the condenser 4, the resistors 38 and 8, and the rectifier 6 are sufficiently well matched with the corresponding condenser 5, the resistors 39 and 9, and the rectifier 7, so that the direct current resulting through meter 10 from the alternating voltage across impedance 2 bears the same relationship to that voltage drop as the direct current resulting from the alternating voltage across impedance 3 bears to that voltage, then if impedance 2 is adjusted until meter 10 reads zero, impedance 2 will equal in magnitude impedance 3. If impedance 2 is calibrated, its reading will be a direct measure of impedance 3. If meter 10 is of the zero center variety as a result either of mechanical or electrical biasing, its deviations from center scale will have a direction as well as a magnitude dependent upon any difference between impedance 2 and impedance 3. This is a characteristic generally found only in direct-current bridges and is a great advantage since it shows in what direction impedance 2 must be varied to equal impedance 3 and provide balance. Similarly, the device may be used as a limit bridge in which impedance 2 is left fixed at a nominal value and deviations of the meter leading from center scale used a measure of the direction and magnitude of any deviation between impedance 3 and impedance 2.

While the above-described method of balance is a convenient condition of operation, it should be understood also that by varying or changing the values of the resistors 8 and 9, 38 and 39, or, if desired, rectifiers 6 and 7, or the condensers 4 and 5, the relative sensitivity of the two respective halves of the circuit may be varied so that relative voltages across impedances 2 and 3 may bear any desired ratio for a condition of any desired degree of current balance through meter 10. In this respect, the system is similar to conventional bridges since, for instance, the ratio of the voltages across impedances 2 and 3 may be the same as the ratio of the resistors 8 and 9. The system differs from conventional bridges because of the addition of the rectifiers 6 and 7 and associated condensers 4 and 5 which are effectively in two of the bridge arms and which cause one part of the bridge to operate at direct current, and the other at alternating current.

The intermediate position B of the switch 11 disconnects one of the rectifiers, in this case 7, and leaves rectifier 6 connected effectively across one of the impedances, in this case 2, so that the current through the meter 10 will, with the switch in this position, be a function of the voltage drop across impedance 2, and thus a measure of the current through impedance 2. If desired, the output voltage of the alternating current source 1 may be adjusted under these conditions to provide any desired meter reading on indicating instrument 10. The circuit could, of course, be equally well arranged to indicate the voltage across, or the current through, impedance 3 which will be equal or proportional in magnitude to the current or voltage through or across impedance 2 depending upon the circuit constants. The purpose of this position B is to obtain a meter reading proportional to said current or voltage through or across one of said impedances.

For a measurement of the relative phase angle between the impedances 2 and 3, switch 11 is turned to position C which not only removes one of the rectifiers, in this case 7, from the circuit as in position B, but also connects the rectifier 6 effectively across both the voltage drops appearing across impedances 2 and 3 in such a way that the current through the rectifier will represent the difference between said voltage drops. This connection places the voltage drop across impedance 3 as transmitted through resistor 39 and condenser 5 effectively in parallel with the voltage drop across impedance 2 as transmitted through resistor 38 and condenser 4, in such a manner that if impedances 2 and 3 have the same phase angle, said voltage drops will subtract directly, thus providing a measure of the difference between said voltage drops. If said voltage drops are equal in magnitude and phase angle, the net difference as indicated by the alternating voltage or current rectified by rectifier 6 and indicated by meter 10 will be zero. If they have been set equal in the previous balance, any deviation from zero indicates, and is a function of, the phase angle difference between the voltage drops across impedances 2 and 3, or in the case of an alternative parallel connection, between the currents in impedances 2 and 3, and is consequently a measure of the difference or the phase angle between the impedances 2 and 3.

As the phase angle difference between impedances 2 and 3 becomes greater, the difference voltage indicated on meter 10 will increase, and meter 10 may, consequently, be calibrated to read directly in terms of said phase difference. Since the reading of meter 10 on one of said voltage drops across either impedance 2 or impedance 3 has been checked with the switch 11 in the B position, thus indicating the absolute magnitude of one of said voltage drops across impedance 2 or impedance 3, the reading of the meter 10 may be interpreted, with the switch 11 in position C, directly in terms of phase angle, and may be so calibrated. As a practical matter, with such an arrangement the scale of a standard linear meter will be very close to linear with respect to phase angle, which is an important advantage.

Fig. 2 shows an arrangement alternative to Fig. 1, in which the relative positions of the condensers 4 and 5 and the rectifiers 6 and 7 are reversed, providing a circuit similar to conventional full-wave power rectifiers. Also in Fig. 2, the phase measurement is made in terms of the sum of, rather than the difference between, the alternating voltage drops existing across impedances 2 and 3. For impedance magnitude measurement with the switch 11 in position A, the direct voltages appearing across condensers 4 and 5 are balanced to provide zero or some predetermined value of current through resistor 89 and meter 10 by varying the impedance 2. Resistor 89 replaces the resistors 8 and 9 of Fig. 1. In position B, the rectifier 6 is connected to provide a reading on meter 10 proportional to the voltage drop across the impedance 2. For phase measurements, the switch is turned to position C in which the rectifier 6 and associated components 4, 89 and meter 10 form a vacuum-tube voltmeter circuit for reading the total alternating voltage drop across impedances 2 and 3, which voltage drop will vary with the relative phase angle of the voltage drop across impedances 2 and 3. As in Fig. 1, the meter 10 may be calibrated directly in terms of phase angle between impedances 2 and 3.

Fig. 3 shows a simplified circuit diagram of an actual commercial test instrument, using the principles of this invention. The circuit is a further elaboration of that shown in Fig. 1 and corresponding parts have the same numbers. In addition, there is added the volume control 12, the transformer 13, the vacuum tubes 14 and 15, with respective plates 16 and 17, grids 18 and 19, the cathodes 20 and 21, plate coupling or load resistors 22 and 23, and the battery or other voltage supply 24. A pair of terminals 103 is provided for connecting the unknown impedance 3 to the circuit, and also a switch 25, allowing disconnection of the standard impedance 2 and use of another pair of terminals 26 for connection of an external standard. In addition, the simple meter or indicating instrument 10 has been augmented to a direct-current vacuum-tube voltmeter 110, comprising the vacuum tube 27 with the plate 28, grid 29, and a cathode 30, the associated resistors 31 and 37, battery or other power supply 36, and indicating meter 10. The simple filter comprising 33 and 34 reduces the amplitude of any alternating voltage components applied to the grid 29 of the voltmeter tube. The function of the circuit 110 is to increase the sensitivity of, and provide proper biasing potentials for, meter 10.

The operation is the same as the operation of the circuit depicted in Fig. 1, but the sensitivity is further increased by the tubes 16 and 17 and their associated circuits. Furthermore, the input impedance of these tubes is so high as to allow high values of impedances 2 and 3 without appreciable errors from shunting currents.

Also, since the switch 11 is at the output of the amplifier tubes 16 and 17, it does not cause additional current to be drawn from the source 1 when the switch 11 is turned to position C, as might be the case under some conditions in Figs. 1 and 2.

The normal operation of Fig. 3 is as follows: the unknown impedance 3 is connected to terminals 103 and with the switch 11 set at position A, the internal standard 2 is adjusted for center-scale or some other predetermined reading of meter 10. The purpose of resistors 31, 32 and 37 in the circuit associated with meter 10, is to provide a convenient reading at center scale or otherwise for the meter 10 when the impedances 2 and 3 are balanced and equal in magnitude or in some other predetermined ratio.

After this, the balance switch 11 is turned to position B and the volume control 12 adjusted for some predetermined reading, such as full scale on meter 10. This calibrates the system for the phase measurement. The switch 11 is then turned to position C to read phase angle and, since the circuit has been standardized in position B, the meter may be directly calibrated. In this case, the phase angle reading is measured in terms of the difference between the alternating voltage drops across resistors 22 and 23. If desired, resistors 31, 32 and 37 may be switched or varied simultaneously with switch 11 to make available the full range of the meter scale for the phase measurement.

Fig. 4 shows an arrangement alternative to Fig. 3, and which may be substituted directly in Fig. 3, in which the voltage dividers 102 and 103 are connected, respectively, across the standard impedance 2 and the unknown impedance 3. By this means, the relative voltages applied to the grids 18 and 19 of the tubes 14 and 15, respectively, may be varied by adjusting the voltage dividers 102 and 103 rather than by varying the standard resistor 2. This is a desirable alternative in cases where, for some reason or other, the standard impedance is not variable. Fig. 4 may be substituted directly for that portion of Fig. 3 to the left of the broken line.

Fig. 5 shows a further alternative whereby the relative gain of the amplifying tubes 14 and 15 is adjusted by varying the grid bias supplied to these tubes. In this case, the plate current flowing from the battery 24 or other source of voltage passes through the plate resistors or other impedances 22 and 23, respectively, between the plate 16 and the cathode 20, and the plate 17 and the cathode 21 of the tubes 14 and 15, respectively, and thence from the cathodes to ground or to the other terminal of plate supply 24 through the resistor 127 by means of the adjustable tap 128. A anlternative path for some of the current is through resistors 125 and 126. These resistors allow sufficient current to flow through resistor 127 to maintain a minimum voltage drop and grid bias even under conditions where the plate current of the tubes 14 and 15 is very small. The voltage appearing between cathode 20 and sliding tap 128 is applied to the grid 18 of the tube 14 through the resistor 2 or the unknown impedance 3 and the transformer 13, and hence controls the mutual conductance of said tube 14. Similarly, the voltage appearing between the cathode 21 of tube 15 and the slider 128 is transmitted through the standard impedance 2 or the unknown impedance 3 and the transformer 13 to the grid 19 of said tube 15, thus controlling the amplification of this tube. Varying the position of the slider 128, therefore, varies the relative gain of the vacuum tubes 14 and 15, and hence the relative alternating voltages appearing across the resistors 22 and 23 or other load impedances. The result, therefore, is the same as with the voltage dividers 102 and 103 of Fig. 4 or when varying the standard resistor or impedance 3 of Fig. 3.

The circuit of Fig. 5 may be considered as a bridge in which impedances 2 and 3 and load resistors 22 and 23 are arms, and the tubes 14 and 15 provide amplification between the arms which is variable by means of the slider 128, hence the balance of the bridge is controlled by adjusting the characteristics of the vacuum tubes 14 and 15. Hence, the relative bridge arms or the relative ratio of the bridge is controlled by varying the characteristics of vacuum tubes.

The present invention, therefore, comprises a method and means for measuring the magnitude and phase angle of alternating current impedance comprising a new type of bridge circuit in which one part of the bridge operates on the applied alternating current, while the other part operates on the direct current resulting from inclusion of rectifiers in the bridge circuits or associated circuits, and means whereby the relative balance and effective balance ratio of the bridge may be controlled by means of vacuum tubes. The system is also useful for other types of bridge and phase measurements.

While for purposes of simplification the invention has been described as embodied in a typical application for measuring impedance and phase angle in terms of a standard resistor or impedance, the same principles and circuits can obviously be adapted or modified to perform the functions of capacitance bridges, inductance bridges, resistance bridges, impedance bridges, etc. Such an instrument may be made direct reading in terms of resistance, capacitance, inductance or impedance, and in terms of phase angle, power factor, dissipation factor, storage cofficient, etc., all of which terms are merely different means of expressing impedance and phase angle, respectively.

Further modifications and changes will also occur to persons skilled in the art, and all such are considered to fall within the spirit and the scope of the present invention, as defined in the appended claims.

What is claimed is:

1. The combination comprising a source of alternating current, a variable impedance of known characteristics, and an unknown impedance connected across said source, a pair of series connected rectifiers, a direct current meter connected thereto to indicate the current difference between said rectifiers, a connection between the common juncture of said rectifiers and the common juncture of said impedances, a plurality of capacitors interconnecting the remaining terminals of said impedances with said rectifiers, a switch interposed between one of said capacitors and said rectifiers for selectively opening said circuit and for connecting one terminal of each of said capacitors together.

2. The combination comprising a source of alternating current, a variable impedance of known characteristics connected in series with an unknown impedance across said source of alternating current, a switch connected to the common juncture between said impedances, a plurality of rectifiers each connected to one of the other terminals of said impedances, a pair of series connected capacitors connected between said rectifiers, a direct current meter connected across said capacitors, a switch connected to the common juncture between said capacitors, and circuit means interconnecting said switches whereby said switches may be operated to selectively join together said common junctures, to open the circuit therebetween and to shunt one of said rectifiers.

3. The method of determining the phase angle between alternating current and voltage appearing across an unknown impedance comprising connecting said impedance in series with an impedance of known characteristic, applying alternating current potential to said series connected impedances, obtaining equal voltages from said impedances while maintaining the current therethrough substantially constant, connecting a meter to produce a current indication proportional to the voltage across one of said impedances, adjusting the magnitude of the alternating current potential applied to said impedances to produce a predetermined deflection of said meter, combining vectorially the equal voltages obtained from said impedances to produce a phase indication on said meter.

4. The method of obtaining the phase angle between alternating current and voltage appearing across an unknown impedance comprising connecting the unknown impedance in series with a variable impedance of known characteristic, applying alternating current potential to said series connected impedances, adjusting said variable impedance to produce there across voltage equal to the voltage across said unknown impedance, obtaining from said impedances voltage components by means of a high impedance circuit, adjusting said voltage components to a predetermined magnitude, combining vectorially the voltage components from across said impedances, and measuring said vectorially combined voltages.

5. The combination comprising a source of alternating current, a variable impedance of known characteristic adapted to be connected in series with an unknown impedance and with said alternating current source, high impedance means including a pair of vacuum tubes for vectorially combining voltages proportional to the voltages appearing across said impedances, rectifying means responsive to said vectorially combined voltages, and a meter connected to said rectifying means to indicate directly the phase angle between the alternating current and voltage of said unknown impedance.

6. The combination comprising a source of alternating current, a variable impedance of known characteristic adapted to be connected in series with an unknown impedance and with said alternating current source, vacuum tube means for obtaining voltages proportional to the voltages appearing across said impedances, an indicating meter, selectively operable circuit means for indicating on said meter a balance between the voltages appearing across said impedances, means for varying the potential applied to said impedances from said alternating curent source to produce a predetermined deflection of said meter when connected across one of said impedances, and selectively operable circuit means for vectorially combining the balanced voltages appearing across said impedances to indicate on said meter the phase angle between voltage and current of said unknown impedance.

7. The combination comprising a source of alternating current, an impedance of known characteristic adapted to be connected in series with an impedance of unknown characteristic and with said alternating current source, a pair of high impedance rectifying devices, means for producing equal voltages across said impedances, means for supplying voltages to said rectifying devices from said impedances without any substantial current change therethrough, and selectively operable circuit means for connecting said rectifying devices differentially to said impedances and for connecting one of said rectifying devices across one of said impedances and for connecting said rectifying device to receive vectorially combined voltages from both said impedances.

8. The combination comprising a source of alternating current, an impedance of known characteristic adapted to be connected in a circuit with an unknown impedance and with said alternating current source, high impedance vacuum tube means for deriving voltages proportional to the voltages appearing across said impedances without substantial change of current therethrough, a direct current meter, circuit means including a three-position switch and two rectifiers for connecting said meter to indicate the ratio between the voltages appearing across said impedances in one position of said switch, another position of said switch connecting said meter and one rectifier across one of said impedances, means for varying the potential applied from said alternating current source to produce a predetermined deflection of said meter, another position of said switch vectorially combining voltages derived from said impedances and supplying said combined voltages to one of said rectifiers whereby said meter indicates the phase angle between the voltage and current of said unknown impedance.

9. The combination comprising a variable source of alternating current, an impedance of known characteristic arranged in a circuit to be connected in series with an unknown impedance and with potential from said alternating current source, vacuum tube means for obtaining voltages representative of the voltages appearing across said impedances without material change of the current therethrough, a direct current indicating meter calibrated to show phase angle, multi-position selectively operable circuit means including rectifying means in one position connecting said meter to indicate the difference in magnitude between said voltages, said circuit means in another position connecting said meter across one of said impedances, said selectively operable circuit means in the remaining position vectorially combining the voltages appearing across said impedances to cause said meter to respond to said vectorially combined voltages to indicate the phase angle between the voltage and the current of said unknown impedance.

10. The method of determining the phase angle between alternating current and voltage appearing across an unknown impedance comprising connecting said impedance in series with an impedance of known characteristics, applying alternating current potential to said series connected impedances, applying a high impedance circuit to said impedances to obtain from said impedances voltage components while maintaining current flow therethrough substantially constant, connecting a meter to produce an indication proportional to the voltage across one of said impedances, adjusting said voltage components to predetermined equal magnitudes as indicated by said meter, combining vectorially said adjusted equal voltage components, and measuring said vectorially combined voltages with said meter calibrated in phase angles.

11. The combination comprising a source of alternating current potential, an impedance of known characteristics, means for connecting said impedance in series with an unknown impedance across said source, vacuum tube means for obtaining potentials proportional to the potentials appearing across said impedances without affecting the curent flow therethrough, an indicating meter calibrated to show phase angles, multi-position selectively operable circuit means including rectifying means for indicating a balance between the potentials obtained by said vacuum tube means, said circuit means being operable to connect said meter to indicate the magnitude of one of said potentials, circuit means for adjusting said potentials to a predetermined magnitude, said selectively operable circuit means including means for vectorially combining said adjusted potentials to indicate on said meter the phase angle between voltage and current of said unknown impedance.

LUCIUS E. PACKARD.
HERMON H. SCOTT.

REFERENCES CITED

The following references are of record in the file of this patent:

UNITED STATES PATENTS

| Number | Name | Date |
| --- | --- | --- |
| 1,684,403 | Mason | Sept. 18, 1928 |
| 1,727,388 | Affel | Sept. 10, 1929 |
| 1,917,417 | Zuschlag | July 11, 1933 |
| 1,944,315 | Clapp | Jan. 23, 1934 |
| 2,340,609 | Mestas | Feb. 1, 1944 |

OTHER REFERENCES

Electronics, May 1943, pages 86–88, 176 and 178.